United States Patent
Hwang

[11] Patent Number: 5,999,676
[45] Date of Patent: Dec. 7, 1999

[54] AERIAL OPTICAL FIBER CABLE

[75] Inventor: Joong-Jin Hwang, Gumi, Rep. of Korea

[73] Assignee: SamSung Electronics Co., Ltd., Suwon, Rep. of Korea

[21] Appl. No.: 08/931,126

[22] Filed: Sep. 16, 1997

[30] Foreign Application Priority Data

Sep. 16, 1996 [KR] Rep. of Korea ............... 96-40187

[51] Int. Cl.⁶ .................................. G02B 6/44
[52] U.S. Cl. ................. 385/106; 385/113; 385/103; 385/105
[58] Field of Search ............... 385/100–114, 115

[56] References Cited

U.S. PATENT DOCUMENTS

| | | | |
|---|---|---|---|
| 5,325,457 | 6/1994 | Bottoms, Jr. et al. | 385/113 |
| 5,384,880 | 1/1995 | Keller et al. | 385/109 |
| 5,630,003 | 5/1997 | Arroyo | 385/106 |

FOREIGN PATENT DOCUMENTS

| | | |
|---|---|---|
| 0 042 996 | 1/1982 | European Pat. Off. . |
| 0 461 871 | 12/1991 | European Pat. Off. . |
| 3637603 C2 | 12/1988 | Germany . |
| 3023398 C2 | 11/1989 | Germany . |

Primary Examiner—Phan T. H. Palmer
Attorney, Agent, or Firm—Robert E. Bushnell, Esq.

[57] ABSTRACT

An aerial optical fiber cable comprising a non-conductive slot forming a cable core, the non-conductive slot having a concavo-concave cross-sectional shape, a pair of tubes each containing a plurality of optical fibers, each of the tubes being disposed in a respective concavity forming the concavo-concave shaped non-conductive slot, a moisture blocking tape wrapped around the non-conductive slot and the tubes, a filling compound disposed within a void formed between the concavities and the moisture blocking tape so prevent the tubes from moving in the concavities, a plurality of rod-type strength members stranded around the moisture blocking tape, and a sheath layer applied over the strength members to protect the aerial optical fiber cable from adverse environmental conditions.

19 Claims, 2 Drawing Sheets

AERIAL OPTICAL FIBER CABLE

CLAIM OF PRIORITY

This application makes reference to, incorporates the same herein, and claims all benefits accruing under 35 U.S.C §119 from an application entitled Aerial Optical Fiber Cable earlier filed in the Korean Industrial Property Office on Sep. 16, 1996, and there duly assigned Serial No. 96-40187 by that Office.

BACKGROUND OF THE INVENTION

1. Field of the Invention

The present invention relates to an aerial optical fiber cable, wherein one or more loose tubes enclosing optical fibers are accommodated within respective grooves formed on a non-conductive slot around which a plurality of strength members are arranged.

2. Description of the Related Art

Generally, aerial optical fiber cables to be deployed by suspending between steel towers and/or utility poles must have excellent mechanical and environmental characteristics to survive the hostile environments (such as wind, rain, snow, lightning, and temperature extremes). As mentioned above, the aerial optical fiber cables are installed by suspending between power transmission towers and/or utility poles.

An exemplary aerial optical fiber cable may comprise a central strength member serving as a central core as well as a central support member, and a plurality of loose tubes around the central strength member, wherein the loose tubes each enclose one or more optical fibers.

Further, the entire outer circumference enclosing all the loose tubes is wrapped with outer shell tapes for preventing moisture penetration. A void space between the outer shell tapes and the central strength member is filled with a filling compound. The outside of the outer shell tape is cladded with a first polyethylene sheath layer for protecting the cable from the adverse environmental conditions. The first polyethylene sheath layer is covered with strength members in order to protect the optical fiber cables from damage caused by the hostile environmental conditions and by the external forces. The outer circumference of the strength members is cladded with a second polyethylene sheath layer for further protecting the above cable component parts against the external adverse environment conditions.

Accordingly, in the above structure of the exemplary aerial optical fiber cable, when the cable is subjected to severe external forces and/or hostile environmental conditions, the strength members and the first and second polyethylene sheath layers slip on each other due to a low friction coefficient, thereby causing damage to the optical fiber cable. And since the strength members are cladded with the polyethylene material, when the cable is exposed to a high temperature, the mechanical strength of the strength members is deteriorated, and hence the adhesive force of the clamp for fixing the optical fiber cable on the power transmission towers and utility poles decreases, resulting in separation of the optical fiber cable from the power transmission towers and utility poles.

SUMMARY OF THE INVENTION

Accordingly, it is an object of the present invention to provide an aerial optical fiber cable capable of protecting the fiber cable itself and fibers inside it from damage and/or breakage, wherein the optical fibers are enclosed in the loose tubes which in turn are laid in the respective slots of the central member.

It is another object of the present invention to provide an aerial optical fiber cable capable of preventing the slipping between the strength members and the sheath layers by incorporating multiple rod-type strength members into the cable.

It further another object of the present invention to provide an aerial optical fiber cable capable of improving the connecting force of the clamp for fixing the aerial optical cable onto the steel towers and utility poles.

According to an embodiment of the present invention, an aerial optical fiber cable comprises a non-conductive slot as central cable core for protecting the optical fibers incorporated therein, and a plurality of non-conductive rod-type strength members having a high tensile strength arranged around the outside of the non-conductive slot.

According to anther embodiment of the present invention, an aerial optical fiber cable comprises a non-conductive slot as central cable core for protecting loose tubes containing a plurality of optical fibers, at least one or more non-conductive grooves formed around the circumference of the slot for accommodating the loose tubes, a plurality of rod-type strength members arranged around the outside of the slot to protect the cable from damage due to the external physical forces, and an outer plastic sheath layer applied over the strength members to protect all the cable component parts.

The present invention will now be described more specifically with reference to the drawings attached only by way of example. It is to be noted that like reference numerals and characters used in the accompanying drawings refer to like constituent elements throughout all drawings, and the following examples are given only with the purpose to allow those skilled in the art to better understand the present invention but in no way they must be construed as a limitation of the invention itself.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
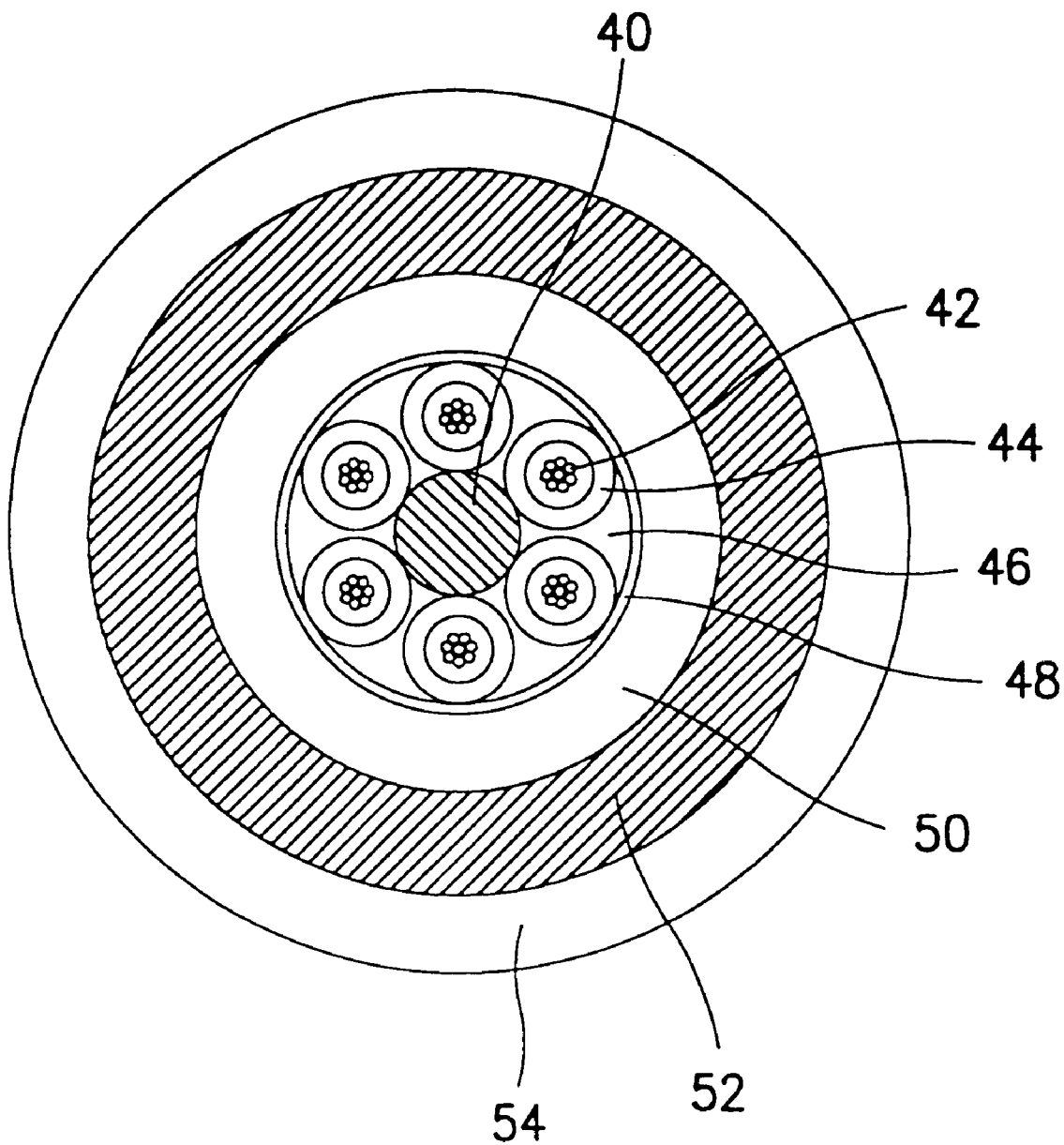
FIG. 1 is a sectional view for illustrating the structure of an exemplary aerial optical fiber cable.

FIG. 1 illustrates the exemplary structure of a general aerial optical fiber cable which comprises a central strength member 40 serving as a central core as well as a central support member, and a plurality of loose tubes 44 outside of and surrounding central strength member 40, whereby loose tubes 44 each enclose one or more optical fibers 42, and the void space between tubes 44, outer shell tape 48 and central strength member 40 is filled with a filling compound 46.

Further, the entire outer circumference enclosing all the loose tubes 44 is wrapped with outer shell tapes 48 for preventing moisture penetration, and outer shell tape 48 is cladded with a first polyethylene sheath layer 50 for protecting the cable from the adverse environmental conditions.

Further first polyethylene sheath layer 50 is covered with strength members 52 in order to protect the optical fiber cables from damage caused by the hostile environmental conditions and by the external forces. The outer circumference of strength members 52 is cladded with a second polyethylene sheath layer 54 for further protecting the cable component parts against the external adverse environment conditions.

Figure 2:
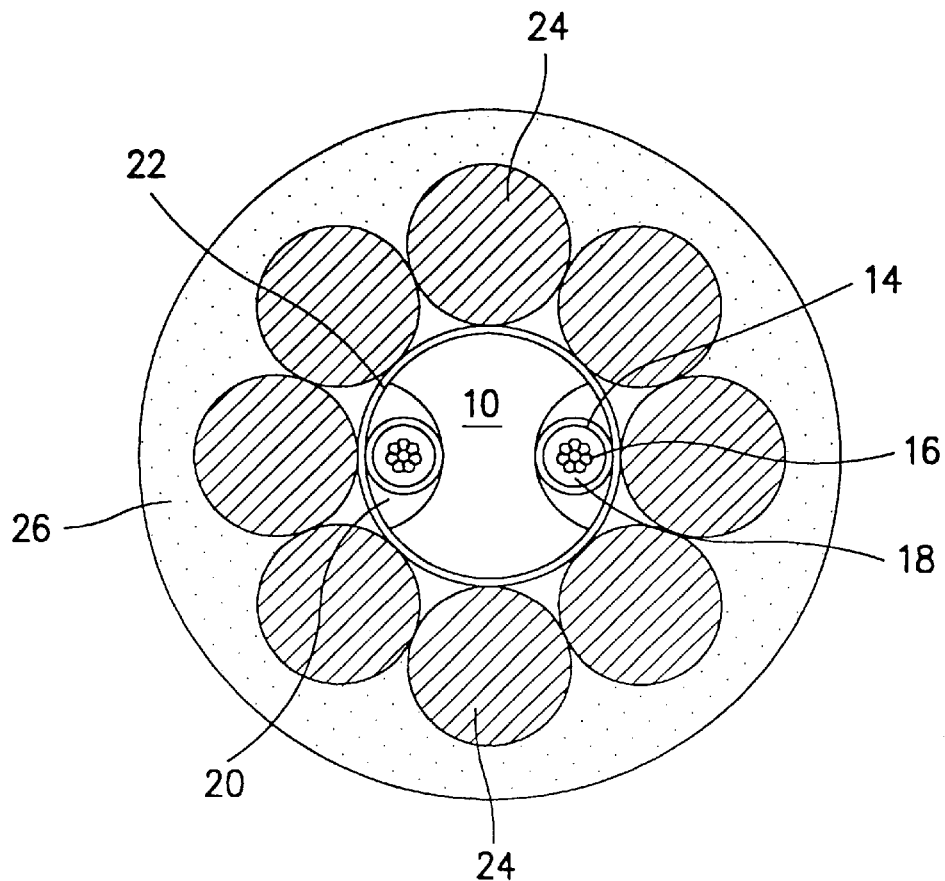
FIG. 2 is a sectional view for illustrating the structure of an aerial optical fiber cable according to a preferred embodiment of the present invention.

Referring to FIG. 2, the above aerial optical cable comprises a cable core formed by a non-conductive slot 10 for protecting one or more loose tubes 14 enclosing one or more optical fibers 16 each coated with acryl resin in the center of the cable, whereby the void spaces inside of each of loose tubes 14 are filled with water-blocking jelly 18. Non-conductive slot 10 is fabricated with a material, e.g., glass yarn, aramid yarn or engineering plastic, having a high mechanical strength sufficient to resist an external impact.

Figure 3:
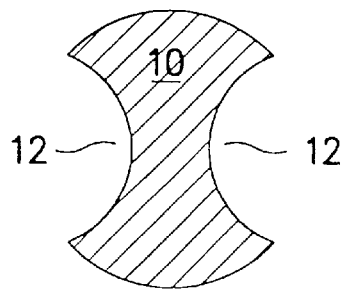
FIG. 3 is a sectional view for illustrating the shape of the non-conductive slot of the aerial optical fiber cable according to the principles of the present invention.

The cross-sectional shape of non-conductive slot 10 is preferably concavo-concave, as shown in FIG. 3. The outer circumference of non-conductive slot 10 may be provided with one or more non-conductive concavities or grooves 12 having a specified pitch required for accommodating loose tubes 14. Non-conductive grooves 12 run the length of non-conductive slot 10 such that the non-conductive grooves form parallel channels which may run straight along the length of the cable core formed by non-conductive slot 10, or may spiral or wind around the cable core formed by non-conductive slot 10. The pitch of non-conductive grooves 12 is a limit free of tensile strain when the cable is pulled by external forces, that is, the pitch is set to permit the clearance of 0.3%–1.0% of optical fibers 16. The void spaces within each of the grooves 12, after accommodating loose tubes 14, are filled with a filling compound 20 to prevent loose tubes 14 from moving within the space between non-conductive grooves 12 and a moisture blocking tape 22.

The outside of the non-conductive slot 10 is wrapped with moisture blocking tape 22 for preventing moisture penetration from the outside of the cable, and a plurality of non-conductive rod-type strength members 24 are orderly arranged around/over tape 22 to protect the cable from damage due to the external physical forces, wherein rod-type strength members 24 may be made from the same material as non-conductive slot 10 in order to resist an external impact.

Strength members 24 may have circular, triangular, square, or diamond-shaped sections, and are arranged around the outside of the non-conductive slot 10 at a specified pitch, whereby the directions of the wound non-conductive grooves 12 and the stranded strength members 24 is opposite to each other to prevent the cable from twisting. And the outer sheath layer 26 is applied over the outside of the strength members 24 to protect the cable component parts against the adverse environmental conditions, whereby the outer sheath layer 26 is made of plastic material like polyethylene and nylon.

As described above, the aerial optical fiber cable according to the embodiment of the present invention has the advantages that a non-conductive slot forms the central cable core, whereby a plurality of rod-type strength members are arranged around the outside of the above slot, hence improving the strength of the cable and thus protecting the cable from damage and/or breakage due to the external physical forces and the hostile environments (like wind, rain, snow, and temperatures), that the loose tubes are laid in the grooves formed in the above slot, thereby improving the compressive strength of the cable and thus preventing the optical fibers from damage, and that the above slot and the strength members are made of glass yarn, aramid yarn or engineering plastic thereby minimizing the thermal deformation of the cable and thus preventing the aerial optical fiber cable from damage due to hostile environmental conditions, such as temperature changes.

What is claimed is:

1. An aerial optical fiber cable comprising:
    a non-conductive slot forming a cable core for protecting bundled optical fibers disposed within at least one concavity formed lengthwise in said non-conductive slot; and
    a plurality of non-conductive rod-type strength members having a high tensile strength arranged around the outside circumference of said cable core.

2. The aerial optical fiber cable as set forth in claim 1, further comprising:
    a plurality of parallel concavities; and
    a plurality of loose tubes each enclosing a bundle of said optical fibers, each said loose tube being disposed in a corresponding one of said concavities, wherein said concavities are formed at a given pitch to accommodate said loose tubes.

3. The aerial optical fiber cable as set forth in claim 2, wherein said cable core is further comprised of:
    a moisture blocking tape wrapped around said non-conductive slot and said loose tubes; and
    a filling compound disposed within a void formed between said concavities and said moisture blocking tape so prevent said loose tubes from moving in said concavities.

4. The aerial optical fiber cable as set forth in claim 2, wherein said non-conductive slot has a concavo-concave cross-sectional shape.

5. The aerial optical fiber cable as set forth in claim 1, wherein said non-conductive slot is made of a material having a high physical strength sufficient to resist the external impact.

6. The aerial optical fiber cable as set forth in claim 5, wherein said material is formed from glass yarn, aramid yarn or engineering plastic.

7. The aerial optical fiber cable as set forth in claim 1, wherein said cable core is further comprised of:
    a moisture blocking tape wrapped around said non-conductive slot and said bundled optical fibers; and
    a filling compound disposed within a void formed between said at least one concavity and said moisture blocking tape so prevent said bundled optical fibers from moving in said at least one concavity.

8. The aerial optical fiber cable as set forth in claim 7, wherein said cable core is further comprised of:
    a moisture blocking tape wrapped around said non-conductive slot and said loose tubes; and
    a filling compound disposed within a void formed between said grooves and said moisture blocking tape so prevent said loose tubes from moving in said grooves.

9. The aerial optical fiber cable as set forth in claim 1, wherein said non-conductive slot has a concavo-concave cross-sectional shape.

10. The aerial optical fiber cable as set forth in claim 1, wherein said at least one concavity formed lengthwise in said non-conductive slot is wound around said non-conductive slot in a first direction, and said strength members are stranded in a second direction opposite to said first direction.

11. The aerial optical fiber cable as set forth in claim 1, wherein said strength members have a circular, triangular, square, or diamond-shaped cross-section, and are arranged around the outside of said cable core at a specified pitch.

12. An aerial optical fiber cable comprising:
- a non-conductive slot forming a cable core for protecting a plurality of loose tubes each containing a plurality of optical fibers;
- a plurality of non-conductive grooves spirally wound around said non-conductive slot for accommodating said loose tubes along a length of said non-conductive slot;
- a plurality of rod-type strength members stranded around said cable core in a direction opposite to a direction of said spirally wound non-conductive grooves to protect said aerial optical fiber cable from damage due to external physical forces; and
- an outer plastic sheath layer applied over said strength members to protect the aerial optical fiber cable from adverse environmental conditions.

13. An aerial optical fiber cable comprising:
- a non-conductive slot forming a cable core, said non-conductive slot having a concavo-concave cross-sectional shape;
- a pair of tubes each containing a plurality of optical fibers, each of said tubes being disposed in a respective concavity forming said concavo-concave shaped non-conductive slot;
- a moisture blocking tape wrapped around said non-conductive slot and said tubes;
- a filling compound disposed within a void formed between said concavities and said moisture blocking tape so prevent said tubes from moving in said concavities;
- a plurality of rod-type strength members stranded around said moisture blocking tape; and
- a sheath layer applied over said strength members to protect the aerial optical fiber cable from adverse environmental conditions.

14. The aerial optical fiber cable as set forth in claim 13, wherein said non-conductive slot and said rod-type strength members are made of a material having a high physical strength sufficient to resist the external impact.

15. The aerial optical fiber cable as set forth in claim 14, wherein said material is formed from glass yarn, aramid yarn or engineering plastic.

16. The aerial optical fiber cable as set forth in claim 13, wherein said concavities are wound around said non-conductive slot in a direction opposite to a direction of said stranded plurality of rod-type strength members.

17. The aerial optical fiber cable as set forth in claim 13, wherein said rod-type strength members have a circular, triangular, square, or diamond-shaped cross-section, and are arranged at a specified pitch.

18. The aerial optical fiber cable as set forth in claim 13, wherein said sheath layer is comprised of a plastic material.

19. The aerial optical fiber cable as set forth in claim 13, wherein said sheath layer is comprised of nylon.

\* \* \* \* \*